(12) United States Patent
Biris et al.

(10) Patent No.: US 10,661,524 B2
(45) Date of Patent: May 26, 2020

(54) CROSSLINKED TUBULAR FOAM

(71) Applicant: HALCOR S.A., Inophyta (GR)

(72) Inventors: Ioannis Biris, Inophyta (GR); George Hinopoulos, Inophyta (GR)

(73) Assignee: HALCOR S.A. (GR)

( * ) Notice: Subject to any disclaimer, the term of this patent is extended or adjusted under 35 U.S.C. 154(b) by 0 days.

(21) Appl. No.: 16/083,623

(22) PCT Filed: Mar. 10, 2017

(86) PCT No.: PCT/EP2017/055702
§ 371 (c)(1),
(2) Date: Sep. 10, 2018

(87) PCT Pub. No.: WO2017/153584
PCT Pub. Date: Sep. 14, 2017

(65) Prior Publication Data
US 2019/0091902 A1 Mar. 28, 2019

(30) Foreign Application Priority Data
Mar. 11, 2016 (EP) .................................. 16159841

(51) Int. Cl.
*B32B 1/08* (2006.01)
*B32B 5/20* (2006.01)
(Continued)

(52) U.S. Cl.
CPC ................ *B32B 1/08* (2013.01); *B29C 44/02* (2013.01); *B29C 44/022* (2013.01); *B29C 44/0461* (2013.01); *B29C 44/0469* (2013.01); *B29C 44/1209* (2013.01); *B29C 44/1214* (2013.01); *B29C 44/1276* (2013.01); *B29C 44/18* (2013.01); *B29C 44/3446* (2013.01);
(Continued)

(58) Field of Classification Search
CPC ... B29C 44/02; B29C 44/022; B29C 44/0461; B29C 44/0469; B29C 44/1209; B29C 44/1214; B29C 44/1276; B29C 44/18; B29C 44/3446; B32B 1/08; B32B 5/20
See application file for complete search history.

(56) References Cited

FOREIGN PATENT DOCUMENTS

| CN | 101275690 A | 10/2008 |
|---|---|---|
| CN | 102218806 A | 10/2011 |

(Continued)

OTHER PUBLICATIONS

PCT International Search Report and Written Opinion, PCT/EP2017/055702, dated May 15, 2017, 13 pp. total.

*Primary Examiner* — Walter Aughenbaugh
(74) *Attorney, Agent, or Firm* — Law Office of Sam Sokhansanj PLLC (57) ABSTRACT

There is provided an insulation foam in a tubular form, comprising at least one seamless layer of crosslinked polyethylene (PEX) closed-cell physical foam. The tubular foam can favourably be used to thermally insulate tubes that convey water, refrigerants or other fluids, in particular, copper tubes for Heating, Ventilation, Air-Conditioning and Refrigeration (HVAC&R) applications, as well as plastic tubes for use in domestic plumbing systems, hydronic radiant heating and cooling systems. There is also provided a method for manufacturing a crosslinked polyethylene (PEX) closed-cell physical foam in seamless tubular form, an insulation foam material using the same and a polymer blend for its manufacturing.

16 Claims, 5 Drawing Sheets

(51) Int. Cl.
*B29C 44/12* (2006.01)
*B29C 44/02* (2006.01)
*B29C 44/04* (2006.01)
*B29C 44/18* (2006.01)
*B29C 44/34* (2006.01)
B29L 23/00 (2006.01)
B29K 105/04 (2006.01)
B29K 105/24 (2006.01)

(52) U.S. Cl.
CPC ............ *B32B 5/20* (2013.01); *B29K 2023/06* (2013.01); *B29K 2105/046* (2013.01); *B29K 2105/24* (2013.01); *B29L 2023/225* (2013.01)

(56) References Cited

FOREIGN PATENT DOCUMENTS

| | | |
|---|---|---|
| CN | 104708839 A | 6/2015 |
| GB | 1480324 A | 7/1977 |
| JP | S5423670 A | 2/1979 |
| JP | S623923 A | 1/1987 |
| WO | WO2017153584 A1 | 9/2017 |

Fig. 4A (units shown in mm)

PEX physical tubular foam          PEX chemical foam sheet

Fig. 4B

| PEX physical tubular foam | PEX chemical foam sheet |

CROSSLINKED TUBULAR FOAM

CROSS REFERENCE TO RELATED APPLICATIONS

This application is the U.S. National Stage of International Patent Application No. PCT/EP2017/055702 filed on Mar. 10, 2017 and which claims priority thereto, which is incorporated herein by reference in its entirety, and which further claims the benefit of EP 16159841.2 filed on Mar. 11, 2016 and which claims priority thereto, which is incorporated herein by reference in its entirety.

FIELD OF INVENTION

The invention relates to insulation foam in a tubular form, comprising at least one seamless layer of crosslinked polyethylene (PEX) closed-cell physical foam. The tubular foam is used to thermally insulate tubes that convey water, refrigerants or other fluids, in particular, copper tubes for Heating, Ventilation, Air-Conditioning and Refrigeration (HVAC&R) applications, as well as plastic tubes for use in domestic plumbing systems, hydronic radiant heating and cooling systems.

BACKGROUND

Conventionally, crosslinked polyethylene (PEX) foam for the insulation of tubes is made in subsequent steps by extruding a sheet of crosslinked polyethylene, expanding this sheet by chemical means (e.g. azodicarbonamide blowing agent) to make a closed-cell foam sheet, then wrapping it around the tube by forming tools and welding the ends. However, because of material memory shape, welded foam sheets exhibit irregularity in their shape when wrapped around tubes. The PEX sheet has a tendency to return to its original flat shape and thus cannot stay perfectly round when wrapped around the tube. This leads to uneven foam thickness around the tube, as well as air gaps on the inside that may lead to loss of insulation and formation of condensation. Moreover, the production process involves several steps of slitting the sheets to size, corrugating the internal area of the film for better wrapping, as well as chamfering the edges of the foam prior to welding, which result in significant volume of material scrap and lower production speeds. Because the PEX material cannot be readily recycled in the same process, the scrap has a high handling cost.

In another conventional method, a non-crosslinked polyethylene material is expended by physical means (e.g. introduction of gas) in tubular foam. However, the non-crosslinked material has a lower strength than a crosslinked material and its operating temperature is about 80° C., after which it starts to gradually soften and eventually melt. This makes non-crosslinked polyethylene foam inappropriate for applications such as air-conditioning systems where the temperature of the refrigeration medium may reach up to 115° C. in its super-heated vapour phase.

BRIEF SUMMARY

It is an object of the present invention to provide a method of making PEX foam in a seamless tubular form as a single tubular layer or, alternatively, comprising at least said seamless tubular foam layer, wherein the method does not require complicated apparatus, involves simpler processing steps and leads to better insulation properties, avoids high operating temperatures, and leads to reduced manufacturing costs. The present invention further relates to the provision of said PEX foam in a seamless tubular form as a single tubular layer or, alternatively, comprising at least said seamless tubular foam layer, which is superior in terms of cell size and its distribution, as well as, the wrapping characteristics and which can be produced by means of the method of the invention. The present invention further relates to the provision of an insulated tube using the same (FIG. 1) and a specific polymer blend, which is used for its manufacturing.

As further discussed below, the present invention is therefore able to provide a method that is simple, involves fewer steps and avoids complicated operations such as edge chamfering or foam corrugation, resulting in significant reduction of production costs. Further, the seamless tubular shaped PEX physical foam eliminates the shape memory resulting in accurate wrapping of the foam around the tube, whereby unevenness of insulation and formation of condensation is eliminated. By forming the foam cells by physical means, i.e. introduction of gas, it is not necessary to use chemical foaming agents and it ensures to attain a PEX foam with a low density with a smaller cell size and more evenly-distributed cell structure. This closed-cell foam structure made from a PEX material has higher dimensional stability, higher compressive strength and ensures high operating temperatures of more than 115° C.

The present invention is directed to the following items 1 to 26.
1. A method for manufacturing a crosslinked polyethylene (PEX) closed-cell physical foam in seamless tubular form, wherein the method comprises, in this order, at least the steps of:
   i) feeding an extruder with raw materials or mixture thereof, comprising at least a polyethylene base resin, crosslinking means, a cell regulator, a cell stabilizer, and optionally a color agent/masterbatch, a fire-resistant additive and other additives;
   ii) feeding foaming gas inside the extruder, adjusting the volume of the highly pressurized gas to obtain a desired foam density, and maintaining the pressure within the extruder to prevent premature foaming upon homogenizing the mixture of melt and blowing gas by the action of the extruder screw;
   iii) extruding the mix of materials through a corresponding die giving the desired tubular form, wherein the sudden pressure drop upon exit of the extrusion die leads to the formation of physical closed-cell foam;
   iv) optionally cooling the extruded physical closed-cell foam;
   v) crosslinking the extruded physical closed-cell foam so as to attain a crosslinked polyethylene (PEX) physical closed-cell foam in seamless tubular form.
2. The method according to item 1, wherein the foaming gas is selected from hydrocarbons, such as pentane, isopentane, cyclopentane, isobutane, and n-butane, inert gases, such as nitrogen and carbon dioxide, and is preferably isobutane and/or n-butane.
3. The method according to item 1 or 2, wherein the foaming gas is injected into the extruder at a pressure of 40 to 70 bar and the pressure is maintained within the extruder to prevent premature foaming.
4. The method according to any one of items 1 to 3, wherein the length/diameter ratio (L/D) of the extruder is selected to be greater than 45:1 and preferably up to 65:1.
5. The method according to any one of items 1 to 4, wherein the extrusion temperature is intentionally kept low so that crosslinking is not activated within the extruder barrel, preferably at the levels of 90-120° C.

6. The method according to any one of items 1 to 5, wherein the extruded physical closed-cell foam is cooled through its external surface by forced air convection.

7. The method according to any one of items 1 to 6, wherein the raw materials or mixture thereof comprises at least a polyethylene base resin, at least a crosslinking agent and catalyst as crosslinking means, a cell regulator, a cell regulator additive, a cell stabilizer, a cell stabilizer additive, an antioxidant and an antistatic agent and optionally a color agent/masterbatch, a fire-resistant additive and other additives.

8. The method according to any one of items 1 to 7, wherein the raw materials or mixture thereof comprises, preferably consists of, the materials in the respective content ranges as follows:

| | | | content | |
|---|---|---|---|---|
| | the raw materials or mixture thereof | | preferred | more preferred |
| kind of raw material | preferred raw material | most preferred raw material | content (wt %) | content (wt %) |
| (i) polyethylene base resin | LLDPE, LDPE, HDPE | LDPE | 75.0 to 95.0 | 82.0 to 94.0 |
| (ii) crosslinking means: | | | | |
| (ii-1) crosslinking agent | silane crosslinker | trimethoxyvinylsilane | 0.75 to 4.0 | 1.0 to 2.5 |
| (ii-2) crosslinking catalyst | organometallic tin compound | dibutyltin dilaurate | 0.1 to 2.0 | 1.0 to 2.0 |
| (ii-3) grafting aid for crosslinking agent | organic peroxide | dicumylperoxide | up to 0.05 parts by weight relative to 100 parts by weight of the base polymer (optional) | 0 (not contained) |
| (iii) antioxidant | hindered phenolic, phosphite, amine and silane-derived antioxidants | methyldecylpolysiloxane-based compound | 0.5 to 3.0 | 1.0 to 2.0 |
| (iv) cell regulator | talc, clay, silica gel | talc | 0.75 to 3.0 | 1.0 to 2.5 |
| (v) cell regulator additive | stearate salts | zinc stearate | 0.01 to 1.0 | 0.05 to 0.5 |
| (vi) antistatic agent | various substances | cocamide diethanolamine | 0.01 to 1.0 | 0.05 to 0.8 |
| (vii) cell stabilizer | glycerol ester and amide compounds, stearamide-related compounds | glycerol monostearate | 0.01 to 1.0 | 0.05 to 0.8 |
| (viii) cell stabilizer additive | waxes | Montan wax | 0.01 to 1.0 | 0.05 to 0.5 |
| (ix) color agent/masterbatch | various substances | | 0.01 to 1.0 | 0.05 to 0.5 |
| (x) fire-retardant additive | various substances | | up to 20.0 (optional) | 1.0 to 10.0 (optional) |
| (xi) other additives | fillers, UV stabilizers, plasticizers, etc. | | up to 10.0 (optional) | 0 (not contained) |

9. The method according to any one of items 1 to 8, wherein the dimensions of the tubular seamless foam range from 6 mm to 22 mm in the internal diameter (ID) and from 4 mm to 25 mm in the foam thickness (T).

10. The method according to any one of items 1 to 9, wherein the crosslinked polyethylene (PEX) physical closed-cell physical foam in seamless tubular form has a crosslinking density of 8.0% to 15.0%, preferably 9.0 to 14.0%, as determined by the gel content method according to ASTM D2765-11.

11. Crosslinked polyethylene (PEX) closed-cell physical foam, characterized in that the crosslinked polyethylene (PEX) closed-cell physical foam has a seamless tubular form and in that it has a crosslinking density of 8.0% to 15.0%, preferably 9.0 to 14.0%, as determined by the gel content method according to ASTM D2765-11.

12. Crosslinked polyethylene (PEX) closed-cell physical foam according to item 11, characterised in that the foam density ranges from 28 to 36 kg/m$^3$, preferably 30 to 32 g/cm$^3$.

13. Crosslinked polyethylene (PEX) closed-cell physical foam according to item 11 or 12, characterised in that the average foam cell size ranges from 0.15 to 0.60 mm, preferably 0.18 to 0.40 mm.

14. Crosslinked polyethylene (PEX) closed-cell physical foam according to any one of items 11 to 13, characterised in that the dimensions of the tubular seamless foam range from 6 mm to 22 mm in the internal diameter (ID) and from 4 mm to 25 mm in the foam thickness (T).
15. Crosslinked polyethylene (PEX) closed-cell physical foam according to any one of item 11 to 14, characterised in that the crosslinked polyethylene (PEX) closed-cell physical foam in seamless tubular form is manufactured according to any one of items 1 to 8.
16. Insulation foam material in tubular form, which comprises at least the crosslinked polyethylene (PEX) closed-cell physical foam according to any one of items 11 to 15, and, optionally and preferably, on its outer surface, a protective sheathing.
17. Insulation foam material in tubular form according to item 16, wherein protective sheathing is provided and wherein the thickness of the protective sheathing (TS) is from 20 to 250 μm.
18. Insulation foam material in tubular form according to item 16 or 17, wherein protective sheathing is provided and wherein the protective sheathing is made from polyethylene, preferably LDPE or a mix of LDPE and LLDPE, optionally including UV-protecting, colour additives and fire-retardant additives.
19. Insulation foam material in tubular form according to any one of items 16 to 18, wherein the protective sheathing is provided in abutment with the crosslinked polyethylene (PEX) closed-cell physical foam.
20. Insulation foam material in tubular form according to any one of items 16 to 18, which comprises, on the outer surface of the crosslinked polyethylene (PEX) closed-cell physical foam, a PEX chemical foam sheet, and, optionally and preferably, on the outer surface of the PEX chemical foam sheet, the protective sheathing.
21. Insulation foam material in tubular form according to any one of items 16, 17, 18 and 20, wherein the PEX chemical foam sheet is provided in abutment on the outer surface of the crosslinked polyethylene (PEX) closed-cell physical foam.
22. Insulation foam material in tubular form according to item 20 or 21, wherein the protective sheathing is provided in abutment on the outer surface of the PEX chemical foam sheet.
23. Insulation foam material in tubular form according to any one of items 20 to 22, wherein the dimensions of the crosslinked polyethylene (PEX) closed-cell physical foam range from 6 mm to 22 mm in the internal diameter (ID) and from 4 mm to 20 mm in the foam thickness (T1), the foam thickness of the PEX chemical foam sheet ranges from 2 mm to 6 mm (T2) and the thickness of the protective sheathing (ST) ranges from 20 to 250 μm.
24. Insulation foam material in tubular form according to any one of items 16, 17, and 20 to 23, which has an embossed protective sheathing.
25. Insulated tube/piping, which is manufactured by using at least a tube/pining and the insulation foam material in tubular form as defined by any one of items 16 to 24.
26. Polymer blend, which comprises, preferably consists of, the materials in the respective content ranges as follows:

| | | | Content | |
| --- | --- | --- | --- | --- |
| the raw materials or mixture thereof | | | preferred | more preferred |
| kind of raw material | preferred raw material | most preferred raw material | content (wt %) | content (wt %) |
| (i) polyethylene base resin | LLDPE, LDPE, HDPE | LDPE | 75.0 to 95.0 | 82.0 to 94.0 |
| (ii) crosslinking means: | | | | |
| (ii-1) crosslinking agent | silane crosslinker | trimethoxyvinylsilane | 0.75 to 4.0 | 1.0 to 2.5 |
| (ii-2) crosslinking catalyst | organometallic tin compound | dibutyltin dilaurate | 0.1 to 2.0 | 1.0 to 2.0 |
| (ii-3) grafting aid for crosslinking agent | organic peroxide | dicumylperoxide | up to 0.04 parts by weight relative to 100 parts by weight of the base polymer (optional) | 0 (not contained) |
| (iii) antioxidant | hindered phenolic, phosphite, amine and silane-derived antioxidants | methyldecylpolysiloxane-based compound | 0.5 to 3.0 | 1.0 to 2.0 |
| (iv) cell regulator | talc, clay, silica gel | talc | 0.75 to 3.0 | 1.0 to 2.5 |
| (v) cell regulator additive | stearate salts | zinc stearate | 0.01 to 1.0 | 0.05 to 0.5 |
| (vi) antistatic agent | various substances | cocamide diethanolamine | 0.01 to 1.0 | 0.05 to 0.8 |

-continued

| kind of raw material | the raw materials or mixture thereof | | Content | |
|---|---|---|---|---|
| | preferred raw material | most preferred raw material | preferred content (wt %) | more preferred content (wt %) |
| (vii) cell stabilizer | glycerol ester and amide compounds, stearamide-related compounds | glycerol monostearate | 0.01 to 1.0 | 0.05 to 0.8 |
| (viii) cell stabilizer additive | waxes | Montan wax | 0.01 to 1.0 | 0.05 to 0.5 |
| (ix) color agent/masterbatch | | various substances | 0.01 to 1.0 | 0.05 to 0.5 |
| (x) fire-retardant additive | | various substances | up to 20.0 (optional) | 1.0 to 10.0 (optional) |
| (xi) other additives | | fillers, UV stabilizers, plasticizers, etc. | up to 10.0 (optional) | 0 (not contained) |

DETAILED DESCRIPTION

The present invention attains the above described advantages by providing a method for manufacturing a crosslinked polyethylene (PEX) closed-cell physical foam in seamless tubular form, the method comprising, in this order, at least the steps of:

i) feeding an extruder with raw materials or mixture thereof, comprising at least a polyethylene base resin, crosslinking means, a cell regulator, a cell stabilizer, and optionally a color agent/masterbatch, a fire-resistant additive and other additives;

ii) feeding foaming gas inside the extruder, adjusting the volume of the highly pressurized gas to obtain a desired foam density, and maintaining the pressure within the extruder to prevent premature foaming upon homogenizing the mixture of melt and blowing gas by the action of the extruder screw;

iii) extruding the mix of materials through a corresponding die giving the desired tubular form, wherein the sudden pressure drop upon exit of the extrusion die leads to the formation of physical closed-cell foam;

iv) optionally cooling the extruded physical closed-cell foam;

v) crosslinking the extruded physical closed-cell foam so as to attain a crosslinked polyethylene (PEX) physical closed-cell foam in seamless tubular form.

The method of the present invention comprises the step (i) of feeding an extruder with raw materials or a mixture thereof (hereinafter simply referred to as polymer blend). Depending on the desired product and its output performance, only one extruder or more extruders, e.g. two extruders (in so-called tandem units), can be employed. In the latter case, a primary extruder may be used for foaming gas supply and homogenization, whereas another (secondary) extruder may serve as a systematic cooling device for the blowing agent-loaded melt. For economic reasons, only one extruder may be used.

The polymer blend to be used in the method of the present invention includes at least a polyethylene base resin, crosslinking means, a cell regulator and a cell stabilizer. In order to achieve a desired foam in terms of foam density, quality and stability, the polymer blend contains at least additives that regulate the formation of the cells (cell regulators; also referred to as nucleation agents) and that stabilize the foam structure (cell stabilizer) of the cellular structure of the physical foam that is created by the blowing agents, as discussed below. In order to further promote the action of the cell regulator and the cell stabilizer, the polymer blend preferably further contains cell regulator additive and cell stabilizer additive, as discussed below.

The polymer blend preferably further contains an antioxidant and an antistatic agent. Therefore, a preferred polymer blend to be used according to the present invention comprises at least a polyethylene base resin, crosslinking means (at least a crosslinking agent and a crosslinking catalyst, optionally a grafting aid for the crosslinking agent), a cell regulator, a cell regulator additive, a cell stabilizer, a cell stabilizer additive, an antioxidant and an antistatic agent and, optionally, a color agent/masterbatch. In order to improve the appearance of the crosslinked polyethylene (PEX) closed-cell physical foam in a seamless tubular form, the polymer blend preferably comprises such a color agent/masterbatch. In case of need, the polymer blend may further contain a fire-retardant additive. Finally, in case of need, it is also possible that the polymer blend may further contain conventional additives, such as fillers, UV stabilizers, plasticizers, etc., provided that those additives do not impair to attain the benefits of the present invention. According to a preferred embodiment, the present invention makes use of a polymer blend with the following composition and content, which may be extruded as a single compound or alternatively as a mixture of several individually pre-manufactured compounds leading to the same overall content percentage. The polymer blend may thus be added to the extruder by multiple feeding hoppers (9) to insert one or more raw materials individually or by using one feeding hopper to introduce all raw materials to the extruder as raw material mixture.

The preferred polymer blend to be used in the present invention comprises the following raw materials in the respective contents as shown in the following Table 1.

oxidant, an antistatic agent, a color agent/masterbatch, and, optionally, a fire-retardant additive, preferably in the amounts and/or using the kinds of materials as shown by Table 1.

The present invention also refers to the provision of a polymer blend comprising, preferably consisting of, a polyethylene base resin, crosslinking means (at least a crosslinking agent, preferably also a crosslinking catalyst, and optionally also a grafting aid for the crosslinking agent, a cell regulator, a cell regulator additive, a cell stabilizer, a cell stabilizer additive, an antioxidant, an antistatic agent, a color agent/masterbatch, and, optionally, a fire-retardant additive, preferably in the amounts and/or using the kinds of materials as shown by Table 1. Such a polymer blend is especially

TABLE 1

| | | | content | |
|---|---|---|---|---|
| the raw materials or mixture thereof | | | preferred | more preferred |
| kind of raw material | preferred raw material | most preferred raw material | content (wt %) | content (wt %) |
| (i) polyethylene base resin | LLDPE, LDPE, HDPE | LDPE | 75.0 to 95.0 | 82.0 to 94.0 |
| (ii) crosslinking means: | | | | |
| (ii-1) crosslinking agent | silane crosslinker | trimethoxyvinylsilane | 0.75 to 4.0 | 1.0 to 2.5 |
| (ii-2) crosslinking catalyst | organometallic tin compound | dibutyltin dilaurate | 0.1 to 2.0 | 1.0 to 2.0 |
| (ii-3) grafting aid for crosslinking agent | organic peroxide | dicumylperoxide | up to 0.04 parts by weight relative to 100 parts by weight of the base polymer (optional) | 0 (not contained) |
| (iii) antioxidant | hindered phenolic, phosphite, amine and silane-derived antioxidants | methyldecylpolysiloxane-based compound | 0.5 to 3.0 | 1.0 to 2.0 |
| (iv) cell regulator | talc, clay, silica gel | talc | 0.75 to 3.0 | 1.0 to 2.5 |
| (v) cell regulator additive | stearate salts | zinc stearate | 0.01 to 1.0 | 0.05 to 0.5 |
| (vi) antistatic agent | various substances | cocamide diethanolamine | 0.01 to 1.0 | 0.05 to 0.8 |
| (vii) cell stabilizer | glycerol ester and amide compounds, stearamide-related compounds | glycerol monostearate | 0.01 to 1.0 | 0.05 to 0.8 |
| (viii) cell stabilizer additive | waxes | Montan wax | 0.01 to 1.0 | 0.05 to 0.5 |
| (ix) color agent/masterbatch | | various substances | 0.01 to 1.0 | 0.05 to 0.5 |
| (x) fire-retardant additive | | various substances | up to 20.0 (optional) | 1.0 to 10.0 (optional) |
| (xi) other additives | | fillers, UV stabilizers, plasticizers, etc. | up to 10.0 (optional) | 0 (not contained) |

A more preferred polymer blend to be used according to the present invention consists of a polyethylene base resin, crosslinking means (at least a crosslinking agent, preferably also a crosslinking catalyst, and optionally also a grafting aid for the crosslinking agent), a cell regulator, a cell regulator additive, a cell stabilizer, a cell stabilizer additive, an antiuseful to provide the crosslinked polyethylene (PEX) closed-cell physical foam in a seamless tubular form having desirable properties.

Hereinafter, the respective raw materials, which can be used in the polymer blend and the method of the present invention, are described in more detail in the following.

Polyethylene Base Resin

The polyethylene base resin to be contained is not specifically limited as long as it is a polyethylene base resin that can be crosslinked to attain crosslinked polyethylene (PEX). It is generally possible to use any kind of polyethylene resin that can be crosslinked, and including those which can be manufactured by known procedures and those being commercially available. The polymer blend comprises one or more polyethylene base resins, wherein one polyethylene base resin preferably accounts for at least 50 wt % of all polyethylene base resins, more preferably at least 80 wt %, still more preferably at least 90 wt %, most preferably 100 wt % (i.e. only one polyethylene base resin is used). Non-limiting examples of polyethylene base resin include linear low density polyethylene (LLDPE; density of about 0.87 to 0.94 g/cm$^3$), low density polyethylene (LDPE; density of about 0.915 to 0.935 g/cm$^3$), high density polyethylene (HDPE; density of about 0.94 to 0.97 g/cm$^3$), ethyl vinyl acetate copolymer (EAV) and polyolefin elastomer (POE). The polyethylenes have a different structure depending on their manufacturing. LDPE is highly branched, while LLDPE and HDPE are linear. Since branched structures are easier to crosslink, it is preferred to use low density polyethylene (LDPE) as the one polyethylene base resin, more preferably only LDPE is used. Notably, it is possible that said polyethylene base resin contains the below described crosslinking agent in a copolymerized and/or grafted manner before feeding to the extruder.

Crosslinking Means

In order to crosslink the polyethylene base resin, the polymer blend comprises crosslinking means. Crosslinking means includes at least a crosslinking agent, preferably in combination with a crosslinking catalyst and optionally in combination with a grafting aid for the crosslinking agent. The crosslinking can be accomplished by known procedures, including peroxide-based crosslinking (PEX-A; also known as peroxide Engel-method) or by means of the silane-based crosslinking (PEX-B, also called the "moisture cure" method). Since the crosslinking is attained by the present invention after the extrusion and foaming, and because the product characteristics are better, it is especially preferred that the crosslinking is accomplished by means of the silane-based crosslinking in which the crosslinking can be easily performed in a secondary post-extrusion process. The crosslinking means to be contained in the polymer blend is not specifically limited as long as suitable crosslinking can be assured, however, at least a crosslinking agent is contained, preferably in combination with a crosslinking catalyst and optionally in combination with a grafting aid for the crosslinking agent.

The polymer blend comprises at least one or more crosslinking agents, wherein one crosslinking agent preferably accounts for at least 50 wt % of all crosslinking agents, more preferably at least 80 wt %, still more preferably at least 90 wt %, most preferably 100 wt % (i.e. only one crosslinking agent is used). Suitable crosslinking agents include hitherto known silane-crosslinking agents, such as tetramethoxysilane, tetraethoxysilane, methoxytriethoxysilane, vinyltrimethoxysilane and vinyltriethoxysilane, more preferably vinyltrimethoxysilane or vinyltriethoxysilane. Since favourable crosslinking can be attained leading to desired product properties, it is especially preferred to use vinyltrimethoxysilane as the one crosslinking agent, more preferably only vinyltrimethoxysilane is used. Notably, it is possible that said crosslinking agent is already copolymerized with and/or grafted onto the above described polyethylene base resin before feeding to the extruder. In case said crosslinking agent is not already copolymerized with and/or grafted onto the above described polyethylene base resin before feeding to the extruder, the polymer blend may further contain one or more grafting aid in order to facilitate the grafting of the crosslinking agent (silane crosslinking agent) onto the base resin, wherein one grafting aid preferably accounts for at least 50 wt % of all grafting aids, more preferably at least 80 wt %, still more preferably at least 90 wt %, most preferably 100 wt % (i.e. only one grafting aid is used). The grafting aid is not specifically limited and includes those hitherto known and those being commercially available. In case a grafting aid is contained, it is preferably a peroxide, more preferably an organic peroxide such as dicumyl peroxide, di-tert-butylperoxide, di-tert-amylperoxide and benzylperoxide, particularly dicumyl peroxide. If the grafting aid is used, it is more preferable that the grafting aid (peroxide) is used in an amount as low as possible, since it may lead to product degradation especially under increased temperature conditions. If used, the grafting aid may be contained in an amount of ≤0.08 parts by weight, preferably ≤0.05 parts by weight, more preferably ≤0.04 parts by weight and most preferably ≤0.02 parts by weight per 100 parts by weight of the polyethylene base resin. Since it is not essential to promote grafting by means of a grafting aid, it is preferred that the polymer blend does not contain a grafting aid (organic peroxide).

In order to facilitate and attained favourable crosslinking, the polymer blend preferably comprises one or more crosslinking catalysts, wherein one crosslinking catalyst preferably accounts for at least 50 wt % of all crosslinking catalysts, more preferably at least 80 wt %, still more preferably at least 90 wt %, most preferably 100 wt % (i.e. only one crosslinking catalyst is used). Suitable crosslinking catalysts include hitherto known crosslinking catalysts, especially silanol condensation catalysts, such as organometallic tin compounds, preferably dibutyltin dimaleate or dibutyltin dilaurate. Since favourable crosslinking can be attained leading to desired product properties, it is preferred to use dibutyltin dilaurate as the one crosslinking agent, more preferably only dibutyltin dilaurate is used.

Antioxidant

The antioxidant that may be contained is not specifically limited as long as it is an antioxidant that can be used for crosslinking polyethylene (PEX). The antioxidant is preferably contained in order to ensure long term stability of the product foam by preventing the product degradation by e.g. heat. Such an antioxidant also ensures that the properties of the resin are preserved under the temperature conduction during extrusion. The polymer blend may comprise one or more antioxidants, wherein one antioxidant preferably accounts for at least 50 wt % of all antioxidants, more preferably at least 80 wt %, still more preferably at least 90 wt %, most preferably 100 wt % (i.e. only one antioxidant is used). Suitable antioxidants include hitherto known antioxidants and those being commercially available, such as hindered phenolic, phosphite, amine and silane-derived antioxidants. Non-limiting Examples comprise pentaerythritol tetrakis(3-(3,5-di-tert-butyl-4-hydroxyphenyl)propionate), 4,6-bis (octylthiomethyl)-o-cresol, (polymerised) trimethyl dihydroquinoline, and a methyldecylpolysiloxane-based compound. Since favourable product properties in terms of e.g. foam density and stability can be attained, it is preferred to use a methyldecylpolysiloxane-based compound as the one antioxidant, more preferably only a methyldecylpolysiloxane-based compound is used.

Cell Regulator and Cell Stabilizer and Respective Additives

The addition of low amounts of cell regulator and cell stabilizer is necessary to attain desirable foam properties and to maintain dimensional stability of polyethylene foam after extrusion.

Initiation of cell formation and promotion of cells of a given size are controlled by cell regulators (also referred to as nucleation agents) included in the polymer composition. The cell regulators influence the formation of a mechanically stabile foamed structure and create discontinuities in the resin phase allowing foaming gas used in cell formation to diffuse properly. Therefore, the polymer blend comprises one or more cell regulators, wherein one cell regulator preferably accounts for at least 50 wt % of all cell regulators, more preferably at least 80 wt %, still more preferably at least 90 wt %, most preferably 100 wt % (i.e. only one cell regulator is used). Suitable cell regulators include hitherto known cell regulators and those being commercially available, such as talc; titanium dioxide; clays such as kaolin sepiolite-type clays, and sepiolite and attapulgite (palygorskite) clays; silica gel; calcium polysilicate; gypsum; metal particles; calcium carbonate; calcium sulfate; magnesium carbonate; magnesium hydroxide; magnesium sulfate; barium sulfate; diatomaceous earth; nano-particles such as nano-particles of calcium carbonate, nano clay and nano-graphite. Since favourable foam properties in terms of e.g. foam density and size can be attained, it is preferred to use talc as the one cell regulator, more preferably only talc is used.

In order to promote the action of the cell regulator, the polymer blend preferably contains one or more cell regulator additives, wherein one cell regulator additive preferably accounts for at least 50 wt % of all cell regulator additives, more preferably at least 80 wt %, still more preferably at least 90 wt %, most preferably 100 wt % (i.e. only one cell regulator additive is used). Such cell regulator additive can promote the action of the cell regulator e.g. by rendering the surface of cell regulator less polar so that a reasonable level of dispersion of the cell regulator can be attained. Suitable cell regulator additives include hitherto known cell regulator additives and those being commercially available, such as suitable surfactant-like molecules as exemplified by e.g. Ba, Ca, and Zn stearates. Since favourable foam properties in terms of e.g. foam density and size can be attained, it is preferred to use zinc stearate as the one cell regulator additive, more preferably only zinc stearate is used.

The dimensional stability of polyethylene foam after extrusion is ensured by cell stabilizers (also referred to as foam aging modifiers) included in the polymer composition. Therefore, the polymer blend comprises one or more cell stabilizers, wherein one cell stabilizer preferably accounts for at least 50 wt % of all stabilizers, more preferably at least 80 wt %, still more preferably at least 90 wt %, most preferably 100 wt % (i.e. only one cell stabilizer is used). Suitable cell stabilizers include hitherto known cell stabilizers and those being commercially available, such as glycerol ester and amide compounds, stearamide-related compounds, more specifically lauramide monoisopropylamine (MIPA), oleamide MIPA, and stearamide 2,3-propanediol, and glycerol monostearate. Since favourable foam properties in terms of stability of e.g. foam density and size can be attained, it is preferred to use glycerol monostearate as the one cell stabilizer, more preferably only glycerol monostearate is used.

In order to promote the action of the cell stabilizer, the polymer blend preferably contains one or more cell stabilizer additives, wherein one cell stabilizer additive preferably accounts for at least 50 wt % of all cell stabilizer additives, more preferably at least 80 wt %, still more preferably at least 90 wt %, most preferably 100 wt % (i.e. only one cell stabilizer additive is used). Such cell stabilizer additive can promote the action of the cell stabilizer. Suitable cell stabilizer additives include hitherto known cell stabilizer additives and those being commercially available, such as esters of abietic acids, polyoxyethylene sorbitan monolaurate, Montan wax, Candelilla wax, Carnauba wax, Paraffine wax, Ceresine wax, Japan wax, Petrolite wax, Ceramer wax, polyethylene wax, and polypropylene wax. Since favourable foam properties in terms of e.g. foam stability, density and size can be attained, it is preferred to use Montan wax as the one cell regulator additive, more preferably only Montan wax is used.

Antistatic Agent

In order to attain favorable antistatic properties, the polymer blend of the present invention may preferably contain one or more antistatic agents, wherein one antistatic agent preferably accounts for at least 50 wt % of all antistatic agents, more preferably at least 80 wt %, still more preferably at least 90 wt %, most preferably 100 wt % (i.e. only one antistatic agent is used). Applicable antistatic agents include hitherto known antistatic agents, including those being commercially available, without particular limitation. Since the favourable foam properties, e.g. foam stability, density and size, are not impaired, it is preferred to use cocamide diethanolamine as the one antistatic agent, more preferably only cocamide diethanolamine is used.

Color Agent/Masterbatch

In order to attain favorable esthetic and appearance, the polymer blend of the present invention may preferably contain one or more color agents/masterbatches, wherein one color agent/masterbatch preferably accounts for at least 50 wt % of all color agents/masterbatches, more preferably at least 80 wt %, still more preferably at least 90 wt %, most preferably 100 wt % (i.e. only one color agent/masterbatch is used). Applicable color agents/masterbatches include hitherto known color agents/masterbatches, including those being commercially available, without particular limitation, including soluble and insoluble inorganic and/or organic dyes and pigments, such as carbon black, white pigments/dyes and/or coloring (blue, green, red etc.) pigments/dyes.

Fire Retardant Additive

The polymer blend can incorporate one or more fire-retardant additives in order to increase its performance to reaction-to-fire, if needed for a specific application. Fire-retardant additives typically feature active ingredients such as organic flame retardants (halogenated or non-halogenated), smoke suppressants and synergistic agents within a polyethylene base resin. In case a fire retardant additive is added then the contents of the formulation are reduced proportionally. Suitable fire retardant additives can be used without any limitation and comprise those well known in the art including those being commercially available.

Other Additives

The polymer blend can also incorporate other additives, if required and according to need, such as fillers, UV stabilizers, plasticizers, etc. These additives encompass those well known in the art including those being commercially available. Those additives may not be contained if they interfere with the desired characteristics of the tubular crosslinked foam. Preferred polymer blends may not contain such other additives.

The method further comprises a step of (ii) feeding foaming gas inside the extruder. That is, the present invention concerns a physical foaming by means of a foaming gas acting as a physical blowing agent. The present invention preferentially does not use any chemical blowing agent (e.g. azodicarbonamide), which usually generates a gaseous reaction product (e.g. $N_2$ or $CO_2$) above a certain temperature acting as a blowing agent. The present invention uses a foaming gas as a physical blowing agent that is metered into the melt mixture during the extrusion process. The present invention uses a physical blowing agent in order to facilitate the production of a PEX physical foam in a seamless tubular form having a lower density, a more homogenous foam structure, better process stability, less generation of undesired by-products and lower blowing agent costs compared to chemical foaming.

The foaming gas may be a (halogenated) hydrocarbon, an inert gas, such carbon dioxide ($CO_2$) and nitrogen ($N_2$), or another suitable gas. In order to attain the best foaming results in terms of foam quality with least effort, the foaming gas is preferably a hydrocarbon, such as isopentane, cyclobutane, isobutene or butane, more preferably isobutene or butane. Although principally useful, formerly applied chlorofluorocarbons and partially halogenated chlorofluorocarbons are not preferred for reasons of environmental safety (ozone depletion potential (ODP)). Although inert gases, such as carbon dioxide ($CO_2$) and nitrogen ($N_2$) can generally be used, it is preferred to use a (non-halogenated) hydrocarbon, since $CO_2$ is more difficult to handle and because $N_2$ has a rather low solubility in polymers to that they cannot achieve foaming of low density polyethylene material as good as hydrocarbon blowing agents.

Figure 1:
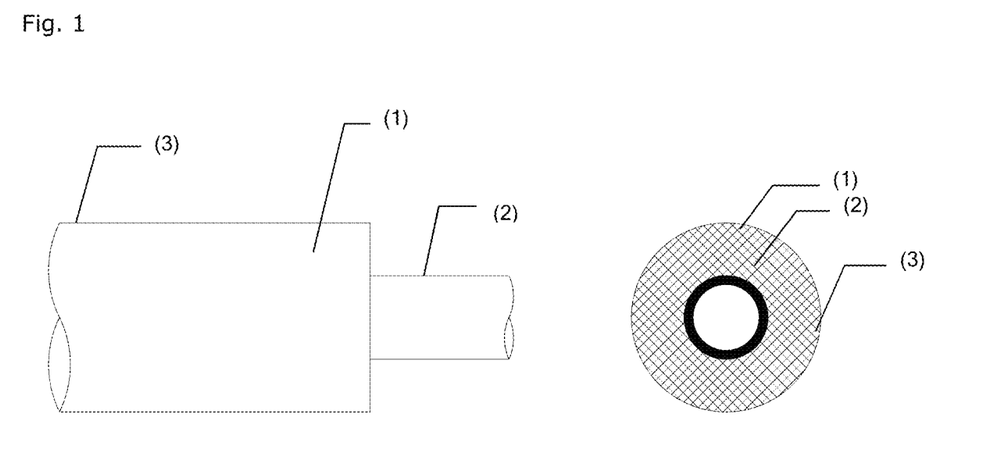
FIG. 1 illustrates a partial side view and cross-sectional view of an insulated tube or piping of the crosslinked polyethylene (PEX) foam in seamless tubular form.

The foaming gas, preferably a hydrocarbon such as isobutene or butane, is injected into the extruder though a gas injection valve. Preferably, the foaming gas is injected with a pressure of 40 to 70 bar. The highly pressurized foaming gas (blowing agent) can be injected into the extruder through a gas injection valve using a metering pump. By using a metering pump, the quantity (volume) of the highly pressurized foaming gas can be directly adjusted to obtain a desired foam density. Preferably, the pressure is adjusted so that the resultant crosslinked closed-cell physical foam has a density ranging from 28 to 36 kg/m³, most preferably from 30 to 32 kg/m³ in order to achieve a high thermal insulation and good mechanical properties. The mixture of melt and blowing gas becomes homogenized by the action of the extruder screw. Due to diffusion, the mixture of melt and blowing agent becomes further homogenized. In order that the screw movement ensures a very good dispersion of the foaming gas in the polymer melt, the extruder machinery is selected specifically for the extrusion of the crosslinkable polymer blend of the present invention. In particular, the length/diameter ratio (L/D), as shown in FIG. 1 is preferably selected to be greater than 45:1, so that the mixing zone is long enough to allow for a desirable homogeneity of the crosslinking agent and the foaming gas within the melt. The upper limit of the length/diameter (L/D) is not particularly limited, however it is usually sufficient that the L/D ratio is up to 65:1.

Figure 2:
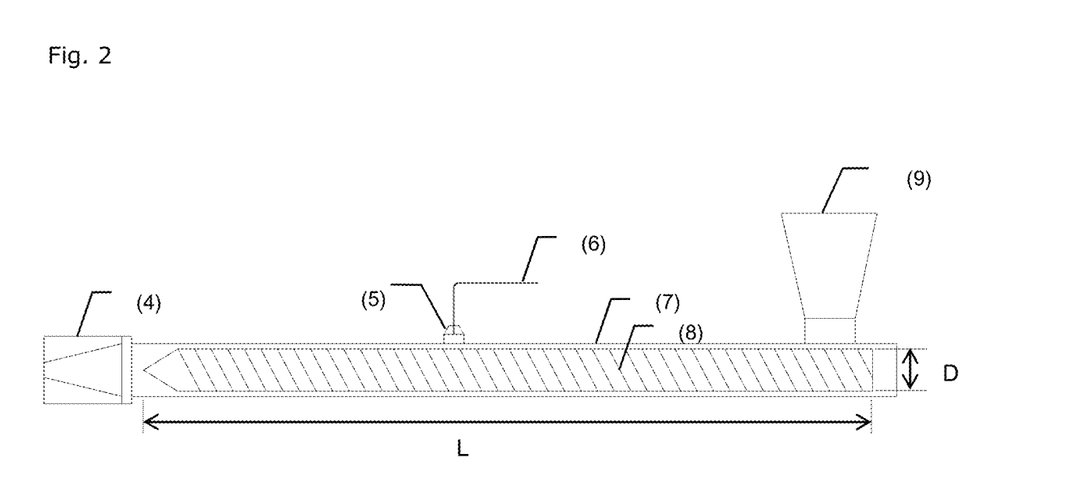
FIG. 2 illustrates a partial side cross-sectional view of an extruder barrel.

Notably, the extrusion temperature is intentionally kept low at a level so that crosslinking is not activated within the extruder barrel (7). Preferably, the extrusion temperature is kept at a value of 90-120° C. Activating the crosslinking reaction within the extruder barrel (7) would pose quality and safety issues due to hardening of the material and subsequent rise of pressure. Therefore, it is preferred to conduct the crosslinking reaction after the extrusion and foaming.

In order to prevent premature foaming, the pressure within the extruder is maintained until the material is coming out of the extrusion die. At the die exit, a sudden and extreme pressure drop (to about 50% of the melt pressure) leads to blowing agent supersaturation in the melt leading to the growing of the gas bubbles and the foam cells are formed. The foaming starts in that the already existing nuclei grow and form the foam bubbles.

As discussed above, in order to increase foam homogeneity, the raw material preferably contains a cell regulator (also called nucleating agent) and a cell regulator additive, which exhibit and facilitate a nucleating function and form a large number of small homogeneously distributed bubbles. In order to stabilize the foam, the raw material preferably further contains a cell stabilizer and a cell regulator additive as discussed above.

Due to favorable homogeneity of the melt and the foaming gas and due the use of cell regulator and stabilizer, it is possible to produce a crosslinked closed-cell physical foam having an average foam cell size desirably ranging from 0.15 to 0.60 mm (with a standard deviation below 0.12), more preferably from 0.18 to 0.40 mm (with a standard deviation below 0.10) attaining especially balanced thermal insulation and mechanical properties. The cell size is measured optically using an image analysis software and taken as the average value of randomly selected cells that account for more than 25% of the surface area.

Figure 3:
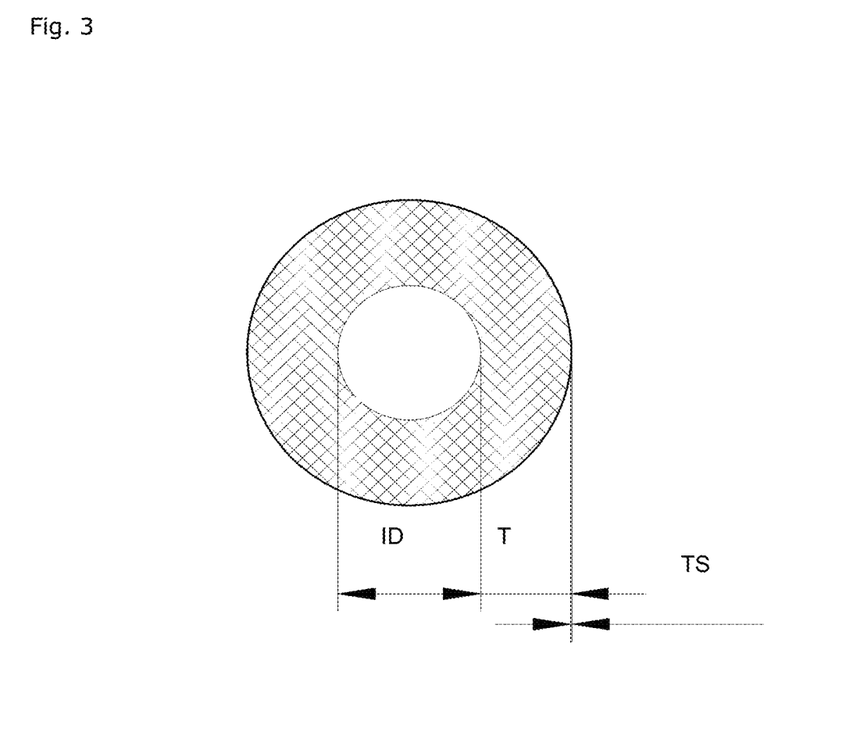
FIG. 3 illustrates a partial cross-sectional view of a protective sheathing.

The method further comprises a step (iii) of extruding the mix of materials through a corresponding die giving the desired tubular form, wherein the sudden pressure drop upon exit of the extrusion die leads to the formation of physical closed-cell foam. The dimensions of the extruded tubular foam (pre-crosslinked) can be of any desirable lengths (including indefinite length) to suit any requirements so as to be useful for all standard sizes for any insulation application. Preferably, the foams is extruded so as to ensure that the dimensions of the resultant tubular seamless PEX foam may range from 6 mm to 22 mm internal diameter (ID) and from 4 mm to 25 mm foam thickness (T) (see FIG. 3).

The method may further comprise a step (iv) of cooling the produced tubular PE foam (pre-crosslinked). The cooling can be performed by conventional means and method and the produced tubular foam is preferably cooled through its external surface by forced air convection. This cooling step stabilized the tubular foam after extrusion, thus facilitating the subsequent crosslinking without loss in product quality. Therefore, it is preferred to conduct the cooling step (iv).

The method further comprises a step (v) of crosslinking the foamed extruded seamless PE foam so as to attain the crosslinked polyethylene (PEX) closed-cell physical foam in seamless tubular form. The crosslinking can be easily performed in a secondary post-extrusion process according to established procedures. The crosslinking can be performed under ambient conditions (ambient temperature and humidity conditions in the air). The crosslinking may be accelerated with heat and/or moisture, e.g. contacting with chilled water bath or contacting with hot water or steam. For reasons of simplicity, the crosslinking is preferably performed under ambient conditions. Preferably, the crosslinked polyethylene (PEX) closed-cell physical foam is manufactured to have a crosslinking density of 8.0% to 14.0%, preferably 9.0 to 13.0%, as determined by the gel content method according to ASTM D2765-11.

The crosslinked polyethylene (PEX) closed-cell physical foam in seamless tubular form can be produced in indefinite lengths to suit any requirements and in all standard sizes for any insulation application, such as hydraulic installations, air-conditioning and refrigeration systems (ACR) etc. However, non-standard sizes can also be made to meet specific requirements. Preferably, the dimensions of the tubular seamless foam may vary from 6 mm to 22 mm internal diameter (ID) and from 4 mm to 25 mm foam thickness (T) (see FIG. 3). Further, in case of need, the crosslinked polyethylene (PEX) closed-cell physical foam in seamless tubular form can be cut in desired length and can be subjected for further modification, such as to attain an embossed structure and protective sheathing etc., and/or be used for further manufacturing of related materials.

Figure 4A:
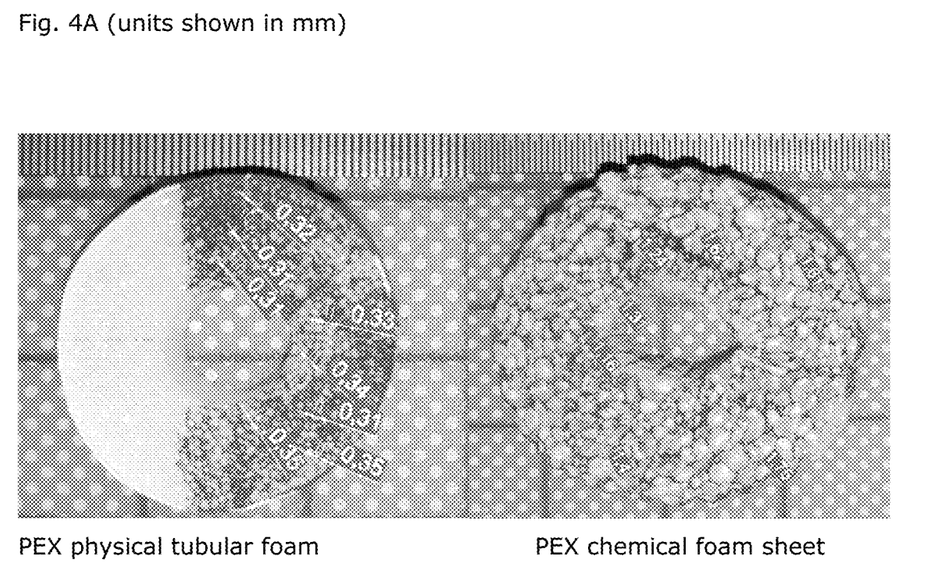
FIG. 4A illustrates partial cross-sectional view photographs of a PEX physical tubular form and PEX chemical foam sheet.
Figure 4B:
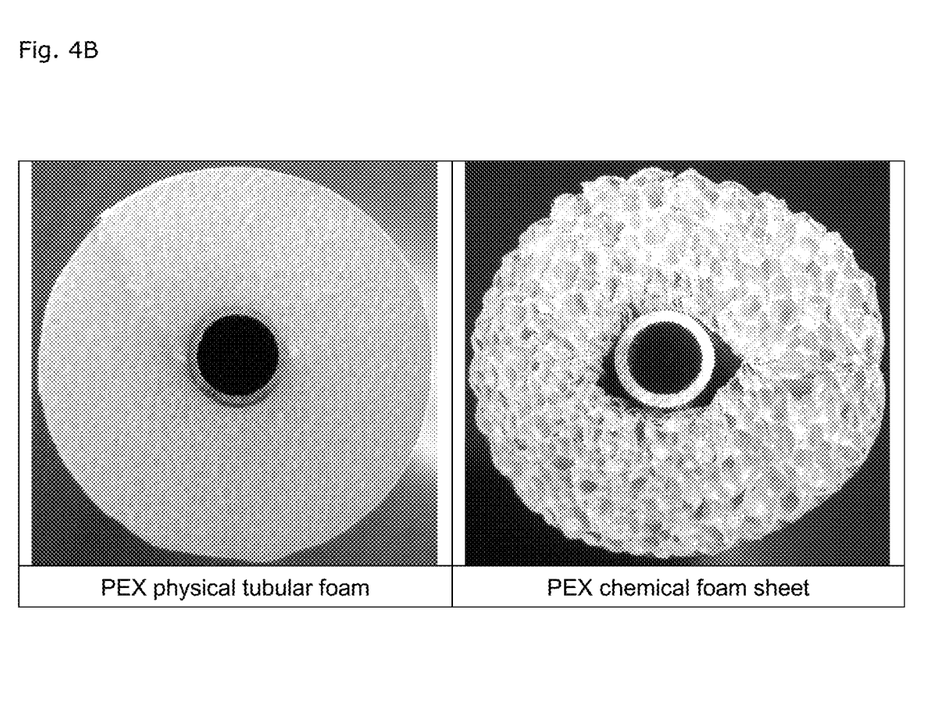
FIG. 4B illustrates partial cross-sectional view photographs of a PEX physical tubular form and PEX chemical foam sheet.
Figure 6:
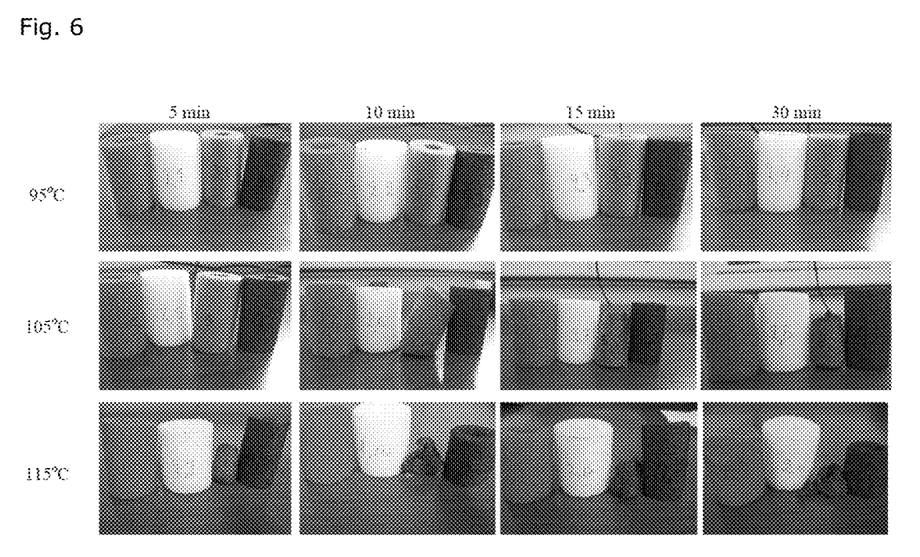
FIG. 6 illustrates side view photographs of PEX chemical foam sheets.

By means of the above method, it is possible to provide a crosslinked polyethylene (PEX) closed-cell physical foam in seamless tubular form being superior in terms of cell size and its distribution (see FIG. 4A), as well as, the wrapping characteristics and stability as compared to conventional PEX chemical foam sheet (see FIG. 4B and FIG. 6).

Thus, the present invention further relates to the provision of a crosslinked polyethylene (PEX) closed-cell physical foam in seamless tubular form being superior in terms of cell size and its distribution, as well as, the wrapping characteristics and stability. The crosslinked polyethylene (PEX) closed-cell physical foam in seamless tubular form may be provided in the form of a single tubular layer. In order to attain the best results in terms of thermal insulation and mechanical properties as well as durability, the crosslinked polyethylene (PEX) closed-cell physical foam has the following characteristics. That is, the crosslinked polyethylene (PEX) closed-cell physical foam has a crosslinking density of 8.0% to 15.0%, preferably 9.0 to 14.0%, as determined by the gel content method according to ASTM D2765-11. In this case, the foam has good mechanical properties and durability upon maintaining a certain degree of thermoplasticity that eases installation, as well as, exhibits a better performance to fire reaction tests as thermoplastics release less amount of energy when burned compared to thermosets. Moreover, the crosslinked polyethylene (PEX) closed-cell physical foam preferably has a density from 28 to 36 $kg/m^3$, more preferably from 30 to 32 $kg/m^3$. Yet further, the crosslinked polyethylene (PEX) closed-cell physical foam preferably has a foam cell size ranging from 0.15 to 0.60 mm, more preferably from 0.18 to 0.40 mm, as determined optically using an image analysis software.

The present invention further relates to the provision of an insulation foam material in tubular form, which comprising the above described crosslinked polyethylene (PEX) closed-cell physical foam in seamless tubular form and, additionally, on its outer surface, a protective sheathing (3). As protective sheathing (3), any suitable material enclosing any hitherto known material can be applied by any suitable methods enclosing any hitherto known method. The protective sheathing is preferably a film is made from polyethylene, typically LDPE or a mix of LDPE and LLDPE, preferably a mix of 75%-35% of LDPE and LLDPE. UV-protecting agents, colour additives and fire-retardant additives may typically be added to the protective sheathing. The film may be extruded on the crosslinked polyethylene (PEX) closed-cell physical foam in a continuous "in-line" process. If a protective sheathing is provided in abutment with the PEX physical foam in a seamless tubular form, the thickness of the optional protective sheathing (TS) may preferably range from 20 to 250 μm (see FIG. 3).

Figure 5A:
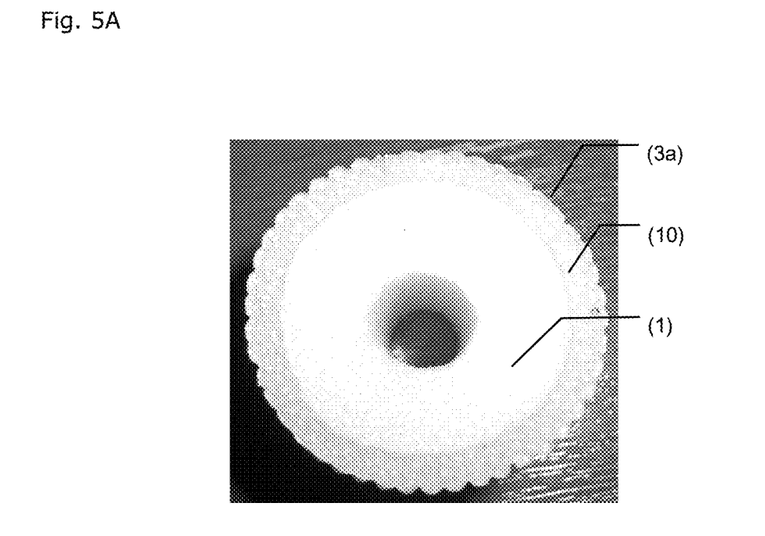
FIG. 5A illustrates a partial cross sectional view photograph of a pre-laminated PEX chemical foam sheet having an embossed protective sheathing.
Figure 5B:
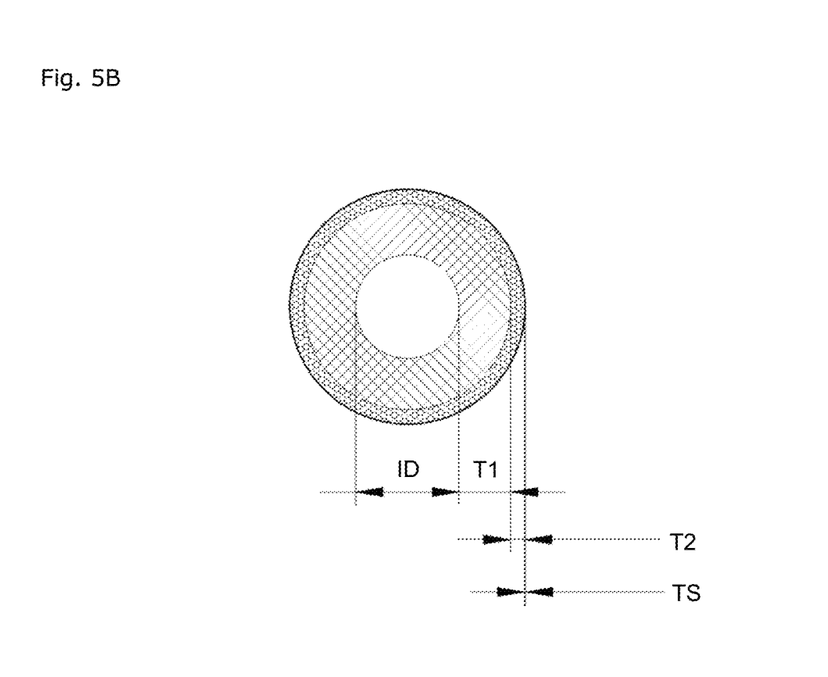
FIG. 5B illustrates a partial cross-sectional view of a PEX chemical foam sheet and a protective sheathing.

The present invention further relates to the provision of an insulation foam material in tubular form, which comprises the above described crosslinked polyethylene (PEX) closed-cell physical foam in seamless tubular form and, additionally, on its outer surface, a PEX chemical foam, and optionally on the outer surface of the PEX chemical foam, a protective sheathing (3). The protective sheathing may the same as indicated above (3) or may have an embossed structure (3a). In this case, the crosslinked polyethylene (PEX) closed-cell physical foam in seamless tubular form may be used as a first insulation layer and the PEX chemical foam may be provided as a second layer insulation layer, preferably by wrapping a PEX chemical foam sheet onto the outer surface of the first insulation layer. Preferably, the second insulating layer (PEX chemical foam) is provided in abutment on the outer surface of the first insulating layer (PEX physical foam), and the optional protective sheathing (3) is provided in abutment on the outer surface of the second insulating layer (PEX chemical foam). This enables the use of pre-laminated PEX chemical foam sheet that has an embossed protective sheathing (3a) on the outside and can provide a differentiation in aesthetics (see FIG. 5A). In this case, the dimensions of the PEX physical tubular foam may range from 6 mm to 22 mm in the internal diameter (ID) and from 4 mm to 20 mm in the foam thickness (T1), whereas the foam thickness of the PEX chemical foam sheet may range from 2 mm to 6 mm (T2) and the thickness of an protective sheathing (ST) may range from 20 to 250 μm (see FIG. 5B).

The physical PEX foam in a seamless tubular form of the present invention may be used to provide an insulated tube/piping as shown in FIG. 1. The tube/piping to be insulated is not specifically limited and encompasses known tube/pipe materials, such as metallic compounds (copper, stainless steel, etc.), plastic materials, as well as multilayer laminates. Any suitable method may be used for the manufacturing of an insulated tube/piping encompassing known methods and means. A suitable method for manufacturing an insulated tube/piping using the crosslinked polyethylene (PEX) closed-cell physical foam in seamless tubular form of the present invention may involve the following method steps:

1. Feeding the tube/piping to be insulated (e.g. copper, plastic, multilayer, etc);
2. Feeding the crosslinked polyethylene (PEX) closed-cell physical foam in seamless tubular form;
3. Slitting on-line the crosslinked polyethylene (PEX) closed-cell physical foam in seamless tubular form and inserting the tube/piping;
4. Welding the ends of the tubular foam, e.g. by hot air gun;
5. Coating the tubular foam with a protective sheathing by extrusion;
6. Optionally cutting to length the insulated tube;
7. Optionally collecting the insulated tube in straight lengths or coils Alternatively, the insulation foam material in tubular form, as described above, may be used instead of the crosslinked polyethylene (PEX) closed-cell physical foam in seamless tubular form in single layer from. In case a pre-laminated PEX chemical foam sheet having an (embossed) protective sheathing (3a) is used as the PEX chemical foam (second insulating layer), the above step 5 may also be omitted.

INDUSTRIAL APPLICATION

The present invention provides suitable methods and products for useful for e.g. thermally insulated tubes that convey water, refrigerants or other fluids, in particular, copper tubes for Heating, Ventilation, Air-Conditioning and Refrigeration (HVAC&R) applications, as well as, plastic tubes for use in domestic plumbing systems, hydronic radiant heating and cooling systems.

EXAMPLES

Example 1—Tubular PEX Foam Insulation ⅜"×9 mm (without Fire-Retardant)

The present invention is used to insulate a copper tube of diameter ⅜" for AC&R applications. The ID of the tubular PEX foam is selected to be 10 mm, its thickness 9 mm and the protective sheathing 80 μm. The foaming gas used is isobutane, introduced at 65 bar. The cross-linking is performed under ambient conditions. The protective sheathing is an extruded LDPE. The average cell size of the foam is 0.2 mm.

The content of the polymer blend is as follows:

| Example 1 | | |
|---|---|---|
| Material Description | Composition | Content |
| Base resin | Low density polyethylene | 93.30% |
| Crosslinking agent | Trimethoxyvinylsilane | 1.00% |
| Antioxidant | Methyldecylpolysiloxane based compound (CAS 68440-89-1) | 1.50% |
| Crosslinking catalyst | Dibutyltin dilaurate | 1.50% |
| Cell Regulator | TALC | 1.00% |
| Cell Regulator Additive | Zinc stearate | 0.10% |
| Antistatic agent | Cocamide Diethanolamine | 0.10% |
| Cell Stabilizer | Glycerol Monostearate | 0.50% |
| Cell Stabilizer Additive | Montan Wax | 0.50% |
| Color | Blue color masterbatch | 0.50% |

Example 2—Tubular PEX Foam Insulation ½"×10 mm (without Fire-Retardant)

The present invention is used to insulate a copper tube of diameter ½" for AC&R applications. The ID of the tubular PEX foam is selected to be 13 mm, its thickness 10 mm and the protective sheathing 80 μm. The foaming gas used is isobutane, introduced at 55 bar. The cross-linking is performed under ambient conditions. The protective sheathing is an extruded LDPE. The average cell size of the foam is 0.25 mm.

The content of the polymer blend is as follows:

| Example 2 | | |
|---|---|---|
| Material Description | Composition | Content |
| Base resin | Low density polyethylene | 92.50% |
| Crosslinking agent | Trimethoxyvinylsilane | 2.00% |
| Antioxidant | Methyldecylpolysiloxane based compound (CAS 68440-89-1) | 1.75% |
| Crosslinking catalyst | Dibutyltin dilaurate | 1.00% |
| Cell Regulator | Talc | 2.20% |
| Cell Regulator Additive | Zinc stearate | 0.20% |
| Antistatic agent | Cocamide Diethanolamine | 0.20% |
| Cell Stabilizer | Glycerol Monostearate | 0.05% |
| Cell Stabilizer Additive | Montan Wax | 0.05% |
| Color | White color masterbatch | 0.05% |

Example 3—Tubular PEX Foam Insulation ½"×10 mm with Fire-Retardant

The present invention is used to insulate a copper tube of diameter ½" for AC&R applications. The ID of the tubular PEX foam is selected to be 13 mm, its thickness 10 mm and the protective sheathing 80 μm. A fire-retardant additive is added to increase its reaction-to-fire performance. The foaming gas used is isobutane, introduced at 60 bar. The cross-linking is performed under ambient conditions. The protective sheathing is an extruded LDPE. The average cell size of the foam is 0.3 mm.

The content of the polymer blend is as follows:

| Example 3 | | |
|---|---|---|
| Material Description | Composition | Content |
| Base resin | Low density polyethylene | 86.00% |
| Crosslinking agent | Trimethoxyvinylsilane | 1.90% |
| Antioxidant | Methyldecylpolysiloxane-based compound (CAS 68440-89-1) | 1.20% |
| Crosslinking catalyst | Dibutyltin dilaurate | 1.00% |
| Cell Regulator | TALC | 1.90% |
| Cell Regulator Additive | Zinc stearate | 0.05% |
| Antistatic agent | Cocamide Diethanolamine | 0.05% |
| Cell Stabilizer | Glycerol Monostearate | 0.80% |
| Cell Stabilizer Additive | Montan Wax | 0.05% |
| Color | Carbon black | 0.05% |
| Fire-retardant | various substances | 7.00% |

Comparative Example(s)

For comparison, a conventional chemical PEX foam sheet was used. The conventional polymer blend contains, among others, a peroxide cross-linking agent and an azodicarbonamide foaming agent and is produced by extrusion of a polymer sheet, passing the polymer sheet through a furnace where foam cells are generated and cross-linking takes place. FIG. 4 illustrates the respective differences concerning foam size and distribution (FIG. 4A) and wrapping characteristics (Fi. 4B).

Evaluation

Evaluation of the Crosslinking Degree

Specimens with the formulation presented in Examples 1, 2 and 3 were measured in terms of crosslinking degree. The degree of crosslinking samples was measured by the gel content method according to ASTM D2765-11. It was found that that crosslinking degree achieved was of the level of 12%, as shown in the table below. The indicated days correspond to the ASTM procedure; the samples were placed in a furnace at 65° C. with humidity present to accelerate crosslinking.

| | Gel Content (%) | | | | |
|---|---|---|---|---|---|
| Sample | 2 Days | 4 Days | 7 Days | 14 Days | 28 Days |
| Example 1 | 11.5 | 11.8 | 11.9 | 11.9 | 11.9 |
| Example 2 | 11.7 | 12.3 | 12.3 | 12.4 | 12.4 |
| Example 3 | 9.2 | 9.8 | 10.4 | 10.7 | 12.7 |

Evaluation of the Dimensional Stability

The thermal resistance was assessed by placing specimens of extruded seamless tubular PEX foam inside a laboratory furnace at various temperatures and their dimensions were monitored at set time intervals. For reference, specimens from a typical production of extruded PEX foam in sheet form were included, as well as, samples from a typical production of extruded PE (non-cross linked) tubular foam. The specimens were numbered as follows:

| Description | Specimen No. |
|---|---|
| PEX physical foam tubular (Example 1) | 1 |
| PEX physical foam tubular (Example 2) | 2 |
| PE (non-crosslinked) physical foam tubular | 3 |
| PEX chemical foam sheet | 4 |

| Specimen No. (1-4 from left to right respectively) | Test temperature | Height of sample before test | Height of sample after 30 min at test temperature | Difference in sample height |
|---|---|---|---|---|
| 1 | 105° C. | 59.8 mm | 56.1 mm | −6% |
| 2 | 105° C. | 61.0 mm | 56.2 mm | −8% |
| 3 | 105° C. | 60.4 mm | 35.4 mm | −41% |
| 4 | 105° C. | 60.2 mm | 56.3 mm | −6% |
| 1 | 115° C. | 59.6 mm | 47.5 mm | −12% |
| 2 | 115° C. | 58.3 mm | 49.6 mm | −15% |
| 3 | 115° C. | 59.8 mm | — | collapsed |
| 4 | 115° C. | 60.6 mm | 53.5 mm | −12% |

Thermal testing showed that the extruded PEX physical tubular foam has a similar thermal resistance to extruded PEX chemical foam sheet at the extreme of temperatures encountered in ACR systems (i.e. >110° C.) and is far superior to the PE (non-crosslinked) physical foam.

REFERENCE SIGNS

1 insulation foam
2 tube
3 protective sheathing
3a embossed protective sheathing
4 die
5 gas injection valve
6 gas line
7 barrel
8 screw
9 feeding hopper(s)
10 PEX chemical foam

The invention claimed is:

1. A method for manufacturing a crosslinked polyethylene (PEX) closed-cell physical foam in seamless tubular form, wherein the method comprises the steps of:
   i) feeding an extruder with raw materials or a mixture thereof, wherein the raw materials or the mixture thereof comprises a polyethylene base resin, a crosslinking agent and a crosslinking catalyst as crosslinking means, a cell regulator, a cell regulator additive, a cell stabilizer, a cell stabilizer additive and an antistatic agent, and optionally a color agent or masterbatch, a fire-resistant additive and one or more other additives;
   ii) feeding foaming gas inside the extruder, adjusting the volume of the gas to obtain a desired foam density, and maintaining a pressure within the extruder to prevent premature foaming upon homogenizing the mixture of melt and blowing gas by the action of the extruder screw, wherein the foaming gas is injected into the extruder at a pressure of 40 to 70 bar and the pressure is maintained within the extruder to prevent premature foaming;
   iii) extruding the mix of materials through a corresponding die giving the desired tubular form, wherein the sudden pressure drop upon exit of the extrusion die leads to the formation of physical closed-cell foam;
   iv) optionally cooling the extruded physical closed-cell foam; and
   v) crosslinking the extruded physical closed-cell foam so as to attain a crosslinked polyethylene (PEX) physical closed-cell foam in seamless tubular form.

2. The method according to claim 1, wherein the foaming gas is selected from inert gases, carbon dioxide, and hydrocarbons comprised of one or more of: pentane, isopentane, cyclopentane, isobutane, n-butane.

3. The method according to claim 1, wherein the length/diameter ratio (L/D) of the extruder is selected from a range of 45:1 up to 65:1.

4. The method according to claim 1, wherein the extrusion temperature is kept such that crosslinking is not activated within the extruder barrel.

5. The method according to claim 1, wherein the raw materials or the mixture thereof comprises:
   75.0 to 95.0 wt. % of the polyethylene base resin selected from at least one of LLDPE, LDPE, or HDPE;
   0.75 to 4.0 wt. % of the crosslinking agent selected from at least one of silane crosslinker or trimethoxyvinylsilane;
   0.1 to 0 wt. % of the crosslinking catalyst from of at least one of organometallic tin compound or dibutyltin dilaurate;
   0.5 to 3.0 wt. % of an antioxidant selected from at least one of hindered phenolic, phosphite, amine and silane-derived antioxidants, or a methyldecylpolysiloxane-based compound;
   0.75 to 3.0 wt. % of the cell regulator selected from at least one of talc, clay, silica gel;
   0.01 to 1.0 wt. % of the cell regulator additive selected from at least one of stearate salts or zinc stearate;
   0.01 to 1.0 wt. % of the antistatic agent;
   0.01 to 1.0 wt. % of the cell stabilizer selected from at least one of glycerol ester and amide compounds, stearamide-related compounds, or glycerol monostearate;
   0.01 to 1.0 wt. % of the cell stabilizer additive selected from waxes or Montan wax; and
   0.01 to 1.0 wt. % of the color agent.

6. The method according to claim 1, wherein the tubular seamless foam as an internal diameter ranging from 6 mm to 22 mm and a foam thickness ranging from 4 mm to 25 mm.

7. An insulation foam material in tubular form, which comprises a crosslinked polyethylene (PEX) closed-cell physical foam, wherein the crosslinked polyethylene (PEX) closed-cell physical foam has a seamless tubular form, a crosslinking density ranging from 8.0% to 15.0%, a foam density ranging from 28 to 36 kg/m$^3$, and an average foam cell size ranging from 0.15 to 0.60 mm.

8. The insulation foam material in tubular form according to claim 7, wherein the crosslinked polyethylene (PEX) closed-cell foam in tubular seamless form has an internal diameter ranging from 6 mm to 22 mm and a foam thickness ranging from 4 mm to 25 mm.

9. The insulation foam material in tubular form according to claim 7, wherein the crosslinked polyethylene (PEX) closed-cell physical foam comprises a protective sheathing, on its outer surface.

10. The insulation foam material in tubular form according to claim 9, wherein the thickness of the protective sheathing ranges from 20 to 250 μm, and wherein the protective sheathing is made from a polyethylene comprised of least one of LDPE or a mix of LDPE and LLDPE.

11. The insulation foam material in tubular form according to claim 9, wherein the protective sheathing is provided in abutment with the crosslinked polyethylene (PEX) closed-cell physical foam.

12. The insulation foam material in tubular form according to claim 9, which comprises on the outer surface of the crosslinked polyethylene (PEX) closed-cell physical foam a PEX chemical foam sheet, and the outer surface of the PEX chemical foam sheet having the protective sheathing.

13. The insulation foam material in tubular form according to claim 12, wherein the PEX chemical foam sheet is provided in abutment on the outer surface of the crosslinked polyethylene (PEX) closed-cell physical foam, and wherein the protective sheathing is provided in abutment on the outer surface of the PEX chemical foam sheet.

14. The insulation foam material in tubular form according to claim 12, wherein the crosslinked polyethylene (PEX) closed-cell physical foam has an internal diameter ranging from 6 mm to 22 mm, a foam thickness ranging from 4 mm to 20 mm; wherein the PEX chemical foam sheet has a foam thickness ranging from 2 mm to 6 mm; wherein the protective sheathing has a thickness ranging from 20 to 250 μm, and wherein the protective sheathing is an embossed protective sheathing.

15. The insulation foam material in tubular form according to claim 9, further comprising an insulated tube or piping manufactured by using at least a tube or piping, and an insulation foam material in tubular form.

16. A polymer blend, comprising:
    75.0 to 95.0 wt. % of a polyethylene base resin selected from at least one of LLDPE, LDPE, or HDPE;
    0.75 to 4.0 wt. % of a crosslinking agent selected from at least one of silane crosslinker or trimethoxyvinylsilane;
    0.1 to 2.0 wt. % of a crosslinking catalyst selected from at least one of organometallic tin compound or dibutyltin dilaurate;
    0.5 to 3.0 wt. % of an antioxidant selected from at least one of hindered phenolic, phosphite, amine and silane-derived antioxidants, or a methyldecylpolysiloxane-based compound;
    0.75 to 3.0 wt. % of a cell regulator selected from at least one of talc, clay, silica gel;
    0.0.1 to 1.0 wt of a cell regulator additive selected from at least one of stearate salts or zinc stearate;
    0.01 to 1.0 wt. % of an antistatic agent;
    0.01 to 1.0 wt. % of a cell stabilizer selected from at least one of glycerol ester and amide compounds, stearamide-related compounds, or glycerol monostearate;
    0.01 to 1.0 wt. % of a cell stabilizer additive selected from waxes or Montan wax; and
    0.01 to 1.0 wt. % of a color agent.

* * * * *